US009481841B2

(12) United States Patent
Rhoads et al.

(10) Patent No.: US 9,481,841 B2
(45) Date of Patent: Nov. 1, 2016

(54) PROCESS OF PREPARATION OF AN ADDITIVE AND ITS USE

(75) Inventors: Gabriel B. Rhoads, Lyndhurst, OH (US); David J. Moreton, Belper (GB); Kenneth P. Morrell, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 1115 days.

(21) Appl. No.: 11/719,458

(22) PCT Filed: Dec. 8, 2005

(86) PCT No.: PCT/US2005/044475
§ 371 (c)(1),
(2), (4) Date: May 16, 2007

(87) PCT Pub. No.: WO2006/063161
PCT Pub. Date: Jun. 15, 2006

(65) Prior Publication Data
US 2009/0149358 A1   Jun. 11, 2009

Related U.S. Application Data

(60) Provisional application No. 60/634,624, filed on Dec. 9, 2004.

(51) Int. Cl.
| | |
|---|---|
| *C10L 1/18* | (2006.01) |
| *C10L 1/10* | (2006.01) |
| *C10L 1/14* | (2006.01) |
| *C08F 8/10* | (2006.01) |
| *C08F 8/12* | (2006.01) |
| *C08F 8/32* | (2006.01) |
| *C08F 8/46* | (2006.01) |
| *C08L 23/26* | (2006.01) |
| *C10L 1/198* | (2006.01) |
| *C10L 1/2383* | (2006.01) |
| *C10L 10/04* | (2006.01) |
| *C10L 10/18* | (2006.01) |
| *C10M 129/93* | (2006.01) |
| *C10M 133/56* | (2006.01) |
| *C10L 1/16* | (2006.01) |
| *C10L 1/182* | (2006.01) |
| *C10L 1/185* | (2006.01) |
| *C10L 1/19* | (2006.01) |
| *C10L 1/22* | (2006.01) |
| *C10L 1/238* | (2006.01) |

(52) U.S. Cl.
CPC .. *C10L 1/14* (2013.01); *C08F 8/10* (2013.01); *C08F 8/12* (2013.01); *C08F 8/32* (2013.01); *C08F 8/46* (2013.01); *C08L 23/26* (2013.01); *C10L 1/198* (2013.01); *C10L 1/2383* (2013.01); *C10L 10/04* (2013.01); *C10L 10/18* (2013.01); *C10M 129/93* (2013.01); *C10M 133/56* (2013.01); *C10L 1/1608* (2013.01); *C10L 1/1616* (2013.01); *C10L 1/1641* (2013.01); *C10L 1/1817* (2013.01); *C10L 1/1824* (2013.01); *C10L 1/1857* (2013.01); *C10L 1/19* (2013.01); *C10L 1/221* (2013.01); *C10L 1/238* (2013.01); *C10M 2207/129* (2013.01); *C10M 2215/28* (2013.01); *C10N 2230/04* (2013.01)

(58) Field of Classification Search
CPC ............ C10M 169/04; C10M 141/06; C10M 129/93; C10M 133/56; C10M 2207/129; C10M 2215/28; C10L 1/14; C10L 1/1608; C10L 1/1817; C10L 1/1824; C10L 1/1857; C10L 1/19; C10L 1/198; C10L 1/221; C10L 1/238; C10L 1/2383; C10L 10/04; C10L 10/08; C10N 2230/04
USPC .......................... 508/287–295, 241, 306, 302
See application file for complete search history.

(56) References Cited

U.S. PATENT DOCUMENTS

| | | | |
|---|---|---|---|
| 2,197,832 A | 4/1940 | Reiff | 87/9 |
| 2,197,835 A | 4/1940 | Reiff | 87/9 |
| 2,228,658 A | 1/1941 | Farrington et al. | 252/39 |
| 2,252,662 A | 8/1941 | Reiff | 260/429 |
| 2,252,664 A | 8/1941 | Reiff et al. | 260/429 |
| 2,501,731 A | 3/1950 | Mertes | 252/33 |

(Continued)

FOREIGN PATENT DOCUMENTS

| | | |
|---|---|---|
| CA | 956397 | 10/1974 |
| CA | 1168222 | 5/1984 |

(Continued)

OTHER PUBLICATIONS

"Ethylene Amines", Encyclopedia of Chemical Technology, Kirk-Othmer, vol. 5, pp. 898-905, Interscience Publishers, NY (1950).

(Continued)

*Primary Examiner* — Latosha Hines
(74) *Attorney, Agent, or Firm* — Iken S. Sans; Teresan W. Gilbert

(57) ABSTRACT

This invention relates to a process for preparing an additive comprising the steps of: (1) reacting a polymer derived from of an olefin containing 2 to 8 carbon atoms with an acylating agent to form an acylated polymer, and (2) reacting the acylated polymer of step (1) in a medium substantially free of to free of sulphur with: (a) ammonia or an amine to form a succinimide product; or (b) water to form a hydrolyzed product, wherein the mole ratio of the acylating agent to polymer in step (1) is from 0.3:1 to 1.6:1. The invention further relates to compositions containing the additive and its use.

10 Claims, No Drawings

(56) References Cited

U.S. PATENT DOCUMENTS

| | | | |
|---|---|---|---|
| 2,616,904 A | 11/1952 | Asseff et al. | 260/399 |
| 2,616,905 A | 11/1952 | Asseff et al. | 260/399 |
| 2,616,906 A | 11/1952 | Asseff et al. | 260/399 |
| 2,616,911 A | 11/1952 | Asseff et al. | 260/413 |
| 2,616,925 A | 11/1952 | Asseff et al. | 260/504 |
| 2,714,092 A | 7/1955 | Culname et al. | 252/36 |
| 2,777,874 A | 1/1957 | Asseff et al. | 260/504 |
| 2,994,408 A | 8/1961 | Sorem et al. | 508/441 |
| 3,002,014 A | 9/1961 | Dinsmore et al. | 250/461 |
| 3,024,237 A | 3/1962 | Drummond et al. | 260/268 |
| 3,087,936 A * | 4/1963 | Le Suer | 548/405 |
| 3,143,507 A | 8/1964 | Mastin et al. | 252/46.6 |
| 3,172,892 A | 3/1965 | LeSuer et al. | 260/326.5 |
| 3,200,107 A | 8/1965 | La Suer | 260/132 |
| 3,219,666 A | 11/1965 | Norman at al. | 260/268 |
| 3,242,080 A | 3/1966 | Wiley et al. | 252/33 |
| 3,245,910 A | 4/1966 | Berkeley | 252/51.5 |
| 3,250,710 A | 5/1966 | Hunt | 252/33 |
| 3,256,185 A | 6/1966 | Le Suer | 252/32.7 |
| 3,256,186 A | 6/1966 | Greenwald | 252/33 |
| 3,271,310 A | 9/1966 | LeSuer | 252/35 |
| 3,272,746 A | 9/1966 | LeSuer | 252/47.5 |
| 3,274,135 A | 9/1966 | Norman et al. | 260/23 |
| 3,278,550 A | 10/1966 | Norman | 260/326.3 |
| 3,280,031 A | 10/1966 | Brennan et al. | 508/441 |
| 3,296,137 A | 1/1967 | Wiese | 252/48.2 |
| 3,306,907 A * | 2/1967 | McNinch et al. | 508/291 |
| 3,312,619 A | 4/1967 | Vineyard | 252/47.5 |
| 3,318,809 A | 5/1967 | Bray | 252/33 |
| 3,320,162 A | 5/1967 | Axe et al. | 252/33 |
| 3,341,542 A | 9/1967 | LeSuer | 260/234 |
| 3,350,348 A | 10/1967 | Braid et al. | 252/46.6 |
| 3,359,203 A | 12/1967 | O'Halloran | 252/46.6 |
| 3,361,856 A | 1/1968 | Le Suer | 260/978 |
| 3,365,396 A | 1/1968 | Schlicht | 252/35 |
| 3,367,943 A | 2/1968 | Miller et al. | 260/326.3 |
| 3,374,174 A | 3/1968 | LeSuer | 252/51.5 |
| 3,381,022 A | 4/1968 | LeSuer | 260/404.8 |
| 3,384,585 A | 5/1968 | Gragson at al. | 252/33 |
| 3,410,798 A | 11/1968 | Cohen | 252/37.2 |
| 3,413,227 A | 11/1968 | Howard et al. | 252/51.5 |
| 3,454,607 A | 7/1969 | LeSuer | 260/408 |
| 3,470,098 A | 9/1969 | O'Halloran | 252/47.5 |
| 3,471,404 A | 10/1969 | Myers | 252/45 |
| 3,488,284 A | 1/1970 | LeSuer | 252/33 |
| 3,492,231 A | 1/1970 | McMillen | 252/33 |
| 3,567,638 A | 3/1971 | Braid | 252/46.7 |
| 3,595,791 A | 7/1971 | Cohen | 252/33.6 |
| 3,600,372 A | 8/1971 | Udelhofen et al. | 260/132 |
| 3,629,109 A | 12/1971 | Gergel et al. | 252/33 |
| 3,630,902 A | 12/1971 | Coupland et al. | 252/51.5 |
| 3,720,616 A | 3/1973 | Randell et al. | 252/51.5 |
| 3,755,169 A | 8/1973 | Adams et al. | 252/35 |
| 3,761,404 A | 9/1973 | Calow | 252/39 |
| 3,784,588 A | 1/1974 | Miles et al. | 260/928 |
| 3,788,993 A | 1/1974 | Andress, Jr. | 252/51.5 |
| 3,816,311 A | 6/1974 | Malec | 252/46.7 |
| 3,897,351 A | 7/1975 | Davis et al. | 252/34 |
| 3,912,641 A | 10/1975 | Wiese et al. | 252/47.5 |
| 3,912,764 A | 10/1975 | Palmer | 260/346.8 |
| 3,914,179 A | 10/1975 | Byford et al. | 252/32.5 |
| 3,923,669 A | 12/1975 | Newingham et al. | 252/32.7 |
| 3,923,672 A | 12/1975 | Durr, Jr. et al. | 252/49.9 |
| 3,926,823 A | 12/1975 | Durr et al. | 252/49.9 |
| 3,931,022 A | 1/1976 | Cheslук et al. | 252/47.5 |
| 3,969,237 A | 7/1976 | Andress, Jr. | 252/49.9 |
| 3,979,308 A | 9/1976 | Mead et al. | 252/32.5 |
| 3,986,967 A | 10/1976 | Okorodudu | 252/49.9 |
| 4,014,894 A | 3/1977 | Andress, Jr. | 260/308 |
| 4,031,023 A | 6/1977 | Musser et al. | 252/48.2 |
| 4,032,461 A | 6/1977 | Hoke | |
| 4,048,082 A | 9/1977 | Nnadi et al. | 252/51.5 |
| 4,060,491 A | 11/1977 | Bridger et al. | 252/50 |
| 4,096,077 A | 6/1978 | Swakon | 252/33.6 |
| 4,100,082 A | 7/1978 | Clason et al. | 252/33.4 |
| 4,115,288 A | 9/1978 | Schmitt | 252/50 |
| 4,119,549 A | 10/1978 | Davis | 252/45 |
| 4,136,043 A | 1/1979 | Davis | 252/47.5 |
| 4,140,643 A | 2/1979 | Davis | 252/47.5 |
| 4,153,562 A | 5/1979 | Jaruzelski | 252/46.6 |
| 4,153,565 A | 5/1979 | Braid et al. | 252/51.5 |
| 4,161,475 A | 7/1979 | Davis | 260/132 |
| 4,162,225 A | 7/1979 | Braid | 252/50 |
| 4,172,855 A | 10/1979 | Shubkin et al. | 585/16 |
| 4,174,284 A | 11/1979 | Borel et al. | 252/48.6 |
| 4,174,285 A | 11/1979 | Braid | 252/50 |
| 4,181,619 A | 1/1980 | Schmitt et al. | 252/32.5 |
| 4,187,186 A | 2/1980 | Braid | 252/51.5 |
| 4,191,659 A | 3/1980 | Davis | 252/45 |
| 4,197,210 A | 4/1980 | Bridger | 252/50 |
| 4,200,545 A | 4/1980 | Clason et al. | 252/33.4 |
| 4,208,357 A | 6/1980 | Hoke | 260/978 |
| 4,230,585 A | 10/1980 | Bird et al. | 252/8.5 |
| 4,234,435 A * | 11/1980 | Meinhardt et al. | 508/192 |
| 4,251,469 A | 2/1981 | Zinke et al. | 260/942 |
| 4,263,150 A | 4/1981 | Clason et al. | 252/32.7 |
| 4,282,171 A | 8/1981 | Hoke | 260/928 |
| 4,368,133 A | 1/1983 | Forsberg | 252/75 |
| 4,388,471 A * | 6/1983 | Wollenberg | 549/255 |
| 4,417,990 A | 11/1983 | Clason et al. | 252/32.7 |
| 4,456,539 A | 6/1984 | Shim | 252/46.7 |
| 4,525,289 A | 6/1985 | Howie et al. | 252/49.9 |
| 4,755,311 A | 7/1988 | Burjes et al. | 252/49.9 |
| 4,792,410 A | 12/1988 | Schwind et al. | 252/38 |
| 5,064,546 A | 11/1991 | Dasai | 252/32.5 |
| 5,241,003 A * | 8/1993 | Degonia et al. | 525/123 |
| 5,356,552 A * | 10/1994 | Harrison et al. | 508/291 |
| 5,433,875 A * | 7/1995 | Rollin et al. | 508/542 |
| 5,478,367 A * | 12/1995 | Sexton et al. | 44/335 |
| 5,492,638 A | 2/1996 | Wallace et al. | 252/18 |
| 5,595,963 A | 1/1997 | Puckace et al. | 508/421 |
| 5,691,283 A | 11/1997 | Poat et al. | 508/186 |
| 5,789,355 A * | 8/1998 | Adams et al. | 508/241 |
| 6,544,935 B1 * | 4/2003 | Vargo | C08F 8/32 508/232 |
| 6,573,223 B1 | 6/2003 | Vinci | |
| 6,588,393 B2 * | 7/2003 | Chamberlin et al. | 123/196 R |
| 7,238,650 B2 * | 7/2007 | Calder | C10M 133/56 44/331 |
| 7,402,186 B2 * | 7/2008 | Spivey | C10L 1/14 44/347 |
| 2002/0053333 A1 * | 5/2002 | Chamberlin et al. | 123/196 R |
| 2006/0276352 A1 | 12/2006 | Vinci | |

FOREIGN PATENT DOCUMENTS

| | | |
|---|---|---|
| EP | 0216909 | 2/1990 |
| EP | 0407124 | 1/1991 |
| EP | 0747465 | 1/1996 |
| EP | 0761805 | 3/1997 |
| EP | 976 813 | 2/2000 |
| EP | 1489105 | 12/2004 |
| GB | 944136 | 12/1963 |
| GB | 1085903 | 10/1967 |
| GB | 1162435 | 8/1969 |
| GB | 1347845 | 2/1974 |
| GB | 1440219 | 6/1976 |
| GB | 2071139 | 9/1981 |
| WO | WO 86/06092 | 10/1986 |
| WO | WO 87/05927 | 10/1987 |
| WO | WO 87/07638 | 10/1987 |
| WO | WO 88/03551 | 5/1988 |
| WO | WO 88/03554 | 5/1988 |
| WO | WO 89/04358 | 5/1989 |
| WO | WO 97/14771 | 4/1997 |
| WO | WO 98/42808 * | 10/1998 |
| WO | WO 00/01790 | 1/2000 |
| WO | WO 00/71646 | 11/2000 |
| WO | WO 02/06428 | 1/2002 |
| WO | WO 02/24842 | 3/2002 |
| WO | 02/102942 | 12/2002 |

(56) References Cited

FOREIGN PATENT DOCUMENTS

| WO | WO 03/035810 | 5/2003 |
|----|--------------|--------|
| WO | WO 2005/078052 | 8/2005 |

OTHER PUBLICATIONS

Yau et al., "Modern Size Exclusion Liquid Chromatographs", J. Wiley & Sons, NY, 1979.

"Sulfonates", Kirk-Othmer, Encyclopedia of Chemical Technology, $2^{nd}$ Ed., vol. 19, pp. 291, Wiley & Sons NY 1969.

Search Report from corresponding international application No. PCT/US2008/078217 dated Feb. 2, 2009.

Search Report from corresponding PCT Publication WO 2006/063161A3; date of publication of Search Report: Feb. 22, 2007.

SAE Paper 821 181, Axle Efficiency Response to Synthetic Lubricant Components, O'Connor et al.

\* cited by examiner

PROCESS OF PREPARATION OF AN ADDITIVE AND ITS USE

FIELD OF INVENTION

The present invention relates to a process for preparing an additive with at least one property of corrosion reduction, dispersancy or detergency. The invention further relates to the use of the additive in a liquid fuel or oil of lubricating viscosity.

BACKGROUND OF THE INVENTION

Commercial diesel fuels contain impurities that can lead to deposition of solids and gums in engines during fuel combustion. Such engine deposit problems are of greater significance for diesel fuels than gasoline fuels because the diesel fuels generally contain greater concentrations of high molecular weight materials. The thermal breakdown of such materials forms insoluble deposits on the engine that can reduce operating efficiency and, ultimately, can lead to corrosion or blockage of fuel injectors and other critical working elements of an engine. To overcome these problems detergent/dispersant additives such as a polyisobutylene succinimide have been extensively used to reduce deposits formation, whereas as a hydrolysed polyisobutylene succinic acid is used to reduce corrosion.

Furthermore, Global legislation towards a reduction of certain components of exhaust emissions, including $NO_x$ (nitrogen oxides) and particulate matter such as soot and oxides of sulphur, produced by automotive engines has resulted in a decrease in the sulphur content of fuel such as diesel fuel and gasoline since the sulphur upon combustion produces highly acidic products and can interfere with the functioning of exhaust after-treatment devices of internal combustion engines. In many countries the sulphur content of fuel has been or is being decreased to less than 50 ppm and newer fuels have even lower sulphur contents of 20 ppm or less. Fuels with a sulphur content of 20 ppm or less are often referred to as ultra-low sulphur fuels.

Furthermore in an attempt to meet emissions targets, automotive manufacturers are developing exhaust after-treatment devices to further reduce emissions. These exhaust after-treatment devices are known to be susceptible to sulphur poisoning even at low sulphur concentrations from sulphur-containing components evolved during fuel combustion. As a consequence of sulphur poisoning, exhaust after-treatment devices may be less efficient which can decrease the performance of the engine and can increase the amounts of regulated components, such as $NO_x$ and particulate matter and hydrocarbons and carbon monoxide, emitted from the exhaust of the engine. It is known that the preparation of a succinimide dispersant/detergent can be done in the presence of a medium including an aromatic solvent or diluent, such as, xylene or toluene or a 100 Neutral mineral oil. However these mediums generally have low flash points and compositions and processes using such mediums are usually limited to lower processing temperatures and have increased flammability risks. In principle higher molecular weight aromatic compounds with higher flash points may be used. However, many of these aromatic compounds have toxicity issues such as being carcinogenic.

Duncan et al. in International Publication No. WO 02/06428A1 disclose an additive composition for improving middle distillate fuel oils that comprises a hydrocarbyl-substituted monosuccinimide dispersant and an oil having a viscosity at 40° C. of 100 to 400 centistokes.

U.S. Pat. No. 5,241,003 discloses the production of an ashless dispersant formed from a substituted acylating agent. The substituted acylating agent is derived from an acylating agent and a polymer wherein the mole ratio of acylating agent to polymer is at least 1:1. The acylating agent if further reacted with an amine or an alcohol in the presence of diluent mineral base oil.

International Application WO 04/065430 discloses a method of preparing a reaction product of a polyolefin polymer having at least 20 carbon atoms with an acid or anhydride or their esters or combinations thereof having a color on the Gardner Color scale of 3 or less and optionally further reacted with an amine or alcohol in the presence of a diluent oil. The acid or anhydride to polyolefin is less than 1.3:1.

It would be advantageous to have a method of preparing an additive with at least one property of corrosion reduction, dispersancy or detergency. The present invention provides such a method.

It would also be advantageous to have an additive capable of imparting at least one of improved fuel economy, a homogeneous air/fuel mix, nozzle cleanliness, injector cleanliness, improved handling, a final product with a higher actives content in a medium substantially free of to free of sulphur i.e. more concentrated and a low sulphur content into a liquid fuel or an oil of lubricating viscosity. The present invention provides such an additive.

It would also be advantageous to have an additive derived from a compound with a concentration of acylating agent during manufacture which when combined with medium substantially free of to free of sulphur produces at least one of improved fuel economy, a homogeneous air/fuel mix, nozzle cleanliness, injector cleanliness, improved handling. The present invention provides such an additive

SUMMARY OF THE INVENTION

The present invention provides a process for preparing an additive comprising the steps of:
(1) reacting a polymer derived from of an olefin containing 2 to 8 carbon atoms with an acylating agent to form an acylated polymer; and
(2) reacting the acylated polymer of step (1) in a medium substantially free of to free of sulphur with:
   a. ammonia or an amine to form a succinimide product; or
   b. water to form a hydrolysed product,
wherein the mole ratio of the acylating agent to polymer in step (1) is from 0.3:1 to 1.6:1.

The invention further provides a composition comprising:
(a) a medium substantially free of to free of sulphur; and
(b) an additive containing an acylating group and a polymer derived from of an olefin containing 2 to 8 carbon atoms,
wherein the additive has a mole ratio of acylating group to polymer of 0.3:1 to 1.6:1.

The invention further provides a method of imparting at least one of detergency, dispersancy, corrosion inhibition or corrosion reduction to a liquid fuel or lubricating composition, the method comprising a composition comprising:
(a) a medium substantially free of to free of sulphur;
(b) an additive containing an acylating agent and a polymer derived from of an olefin containing 2 to 8 carbon atoms; and
(c) a liquid fuel or an oil of lubricating viscosity,
wherein the additive has a mole ratio of acylating agent to polymer of 0.3:1 to 1.6:1.

DETAILED DESCRIPTION OF THE INVENTION

The present invention provides a process for preparing an additive comprising the steps of:
(1) reacting a polymer derived from of an olefin containing 2 to 8 carbon atoms with an acylating agent to form an acylated polymer; and
(2) reacting the acylated polymer of step (1) in a medium substantially free of to free of sulphur with:
  (1) ammonia or an amine to form a succinimide product; or
  (2) water to form a hydrolysed product,
wherein the mole ratio of the acylating agent to polymer in step (1) is from 0.3:1 to 1.6:1.

In one embodiment the mole ratio of the acylating agent to polymer in step (1) of the process is 0.6:1 to 1.5:1, in another embodiment 0.8:1 to 1.45:1, in another embodiment 1:1 to 1.4:1, in another embodiment 1.1:1 to 1.5:1, and in another embodiment 1:1 to 1.3:1.

In one embodiment the process of step (1) produces an acylated polymer with 30 wt % or more as a mono-substituted acylated polymer, in another embodiment 40 wt % or more as a mono-substituted acylated polymer, in another embodiment 50 wt % or more as a mono-substituted acylated polymer and in another embodiment 60 wt % or more as a mono-substituted acylated polymer.

In one embodiment the amount of unreacted polymer in step (1) is less than 30 mole % of polymer, less than 20 mole % of polymer or less than 10 mole % of polymer.

In embodiments of the invention, step (1) of the process is carried out at elevated temperatures generally from 150° C. to 250° C. in the presence of a promoter such as the halogen chlorine or in the absence of a promoter such as, e. g., chlorine gas. In other embodiments of the invention, step (1) is carried out in a batch process or in a continuous process.

Optionally step (1) of the process contains a medium substantially free of to free of sulphur.

In one embodiment reacting the acylated polymer with ammonia or an amine in step (2) of the process, generally involves heating the reactants at temperatures of 100° C. to 250° C.

In one embodiment reacting the acylated polymer with water in step (2) of the process, generally involves heating the reactants at temperatures of 45° C. to 105° C. or 70° C. to 99° C.

In one embodiment the weight ratio of the additive prepared in step (2) to the medium may be 1:99 to 99:1, in another embodiment 5:95 to 95:5, in another embodiment 25:75 to 90:10 and in another embodiment 45:55 to 90:10. Examples of typical weight ratios of the additive to the medium include 50:50 to 80:20, 55:45 to 75:25, 60:40 to 70:30 and 65:35 to 85:15.

In one embodiment the process of step (1) and/or step (2) involves minimal processing to remove of unreacted acylating agent by chemical or physical means. In another embodiment the process of step (1) and/or step (2) does not involve removing unreacted acylating agent by chemical or physical means, for instance, vacuum stripping and/or filtration.

In one embodiment the product of step (2) has a Total Base Number (TBN) of 3 or more, or 25 or more, 50 or more or 55 or more. Generally the TBN may be below 100, 90 or less or 85 or less.

Polymer

The method includes reacting a polymer derived from of an olefin containing 2 to 8 carbon atoms and in another embodiment 3 to 6 carbon atoms. Examples of a suitable olefin include propylene, isobutylene, pentene or hexane. In one embodiment the polymer is derived from isobutylene to form a polyisobutylene.

In one embodiment the polymer has a terminal C=C double bond group, i.e., a vinylidene group. In one embodiment the vinylidene group is present on 40% or more of the polymer molecules, in another embodiment the vinylidene group is present on 50% or more of the polymer molecules, in another embodiment the vinylidene group is present on 60% or more of the polymer molecules, and in another embodiment the vinylidene group is present on 70% or more of the polymer molecules, such as about 75%, about 80% or about 85%.

The polymer in one embodiment has a number average molecular weight of 300 to 5000, 450 to 2500, 500 to 1500 or 550 to 1200. In one embodiment the polymer has a number average molecular weight of about 550, in another embodiment about 750 and in another embodiment about 950 to 1000.

The polymer polydispersity in one embodiment is 1 to 4 and in another embodiment 1.2 to 2.5.

The polymer may be obtained commercially under the tradenames of Glissopal®1000 or Glissopal®2300 (commercially available from BASF), TPC®555, TPC®575 or TPC®595 (commercially available from Texas Petroleum Chemicals).

The polymer may be derived from a one olefin or combinations thereof.

In one embodiment the process further comprises reacting the succinimide product of step (2) with a boron containing compound or a zinc oxide to form a borated dispersant or a zinc containing dispersant. Methods of preparing a boron containing and/or zinc containing dispersant are well known in the art and include procedures as described in U.S. Pat. Nos. 3,163,603 and 3,087,936.

Acylating Agent

The acylating agent of the invention may be a compound with one or more acid functional groups, such as a carboxylic acid or anhydride thereof. Examples of an acylating agent include an alpha, beta-unsaturated mono- or polycarboxylic acid, anhydride ester or derivative thereof. Examples of an acylating agent include (meth) acrylic acid, methyl (meth) acrylate, maleic acid or anhydride, fumaric acid, itaconic acid or anhydride, or mixtures thereof.

Amine

The amine generally is well known in the art and generally has at least one reactive N—H bond (nitrogen to hydrogen bond). The amine is optionally further substituted with other functional groups, such as a hydroxyl. The amine includes a monoamine, a polyamines, or mixtures thereof. In one embodiment the amine contains one or more primary or secondary amino groups.

The monoamine in one embodiment has 1 to 22 carbon atoms. Examples of a monoamine include butylamine, methylamine, dimethylamine, an alkanolamine containing one or more hydroxy groups such as ethanolamine, or mixtures thereof.

Polyamines in one embodiment include an alkylenediamine or a substituted alkylenediamine, such as, ethylenediamine and N-methyl propylenediamine, polyalkylene polyamines, for instance, tetraethylenepentamine and polyethylene polyamine bottoms, an alkanolamine containing one or more hydroxy groups such as 2-(2-aminoethylamino) ethanol, aminoalkyl substituted heterocyclic compounds such as 1-(3-aminopropyl)imidazole and 4-(3-aminopropyl)morpholine, condensates of polyamines with polyhydroxy compounds such as condensates of polyethylene polyamines with tris(hydroxymethyl)aminomethane as described in U.S. Pat. No. 5,653,152, or mixtures thereof. In an embodiment the amine is tetraethylenepentamine. In other embodiments of the invention, the amine is a polyethylenepolyamine, such as e. g. tetraethylenepentamine, which is reacted with an acylated polymer, such as e. g. a polyisobutenylsuccinic anhydride, where the ratio of amine nitrogen groups to acylated polymer carbonyl groups is 1.3-2.7:1, 1.4-2.6:1, or 1.6-2.4:1. In a further embodiment of the invention, the reaction product of the polyethylenepolyamine and acylated polymer is a gasoline or a diesel fuel additive which is free of or nearly free of boron.

Medium Substantially Free of to Free of Sulphur

The medium substantially free of to free of sulphur of the invention (hereinafter referred to as "the medium") may also be described as a solvent or a diluent. The medium may be aliphatic, aromatic, or a mixture thereof. The medium may be a hydrocarbon, a nonhydrocarbon such as an alcohol or ester of a carboxylic acid, or a mixture thereof. The medium may be a single solvent or diluent or a mixture of two or more solvents or diluents. In an embodiment of the invention the medium is an aromatic hydrocarbon, and in other embodiments is a mixture of an aliphatic and an aromatic hydrocarbon, a mixture of an aliphatic and aromatic hydrocarbon where the aliphatic hydrocarbon is present at 50% by weight or more, and an aliphatic hydrocarbon.

The term substantially free of to free of sulphur means that the medium contains no or only trace amounts of sulphur. Often the sulphur content of the medium on a weight basis is below 25 ppm, in another embodiment below 18 ppm, in another embodiment below 10 ppm and in another embodiment below 8 or 4 ppm. In one embodiment the medium substantially free of to free of sulphur has a sulphur content below 2 ppm by weight. Those skilled in the art will appreciate that the medium may comprise small quantities of compounds with a sulphur content above the ranges given hereinabove provided that total sulphur content of the medium is within the ranges given.

The medium often contains an aliphatic hydrocarbon solvent or diluent present from at least 50 wt % to 100 wt %, in another embodiment 60 wt % to 100 wt %, in another embodiment 70 wt % to 100 wt %, in another embodiment 80 wt % to 100 wt % and in another embodiment 90 wt % to 100 wt % of the total amount of the medium. In one embodiment the medium contains an aliphatic hydrocarbon solvent or diluent present at about 7 wt % of the total amount of the medium. In one embodiment the medium contains an aliphatic hydrocarbon solvent or diluent present at about 5 wt % of the total amount of the medium. In one embodiment the medium contains an aliphatic hydrocarbon solvent or diluent present at about 0 wt % of the total amount of the medium.

Often the medium has a boiling point of 150° C. or higher, in another embodiment 175° C. or higher, in another embodiment 200° C. or higher and in another embodiment 225° C. or higher. In one embodiment the boiling point is about 250° C. In one embodiment the boiling point is about 258° C. Those skilled in the art will appreciate that the medium substantially free of to free of sulphur may include small quantities of compounds with a boiling point below the ranges given above provided that the boiling point of the medium is within the ranges given.

Often the medium substantially free of to free of sulphur has a flash point of 90° C. or higher, and in other embodiments of the invention the medium has a flash point of 105° C. or higher, 120° C. or higher and 130° C. or higher. In further embodiments of the invention the medium has a flash point of 145° C. or higher and 150° C. or higher. Those skilled in the art will appreciate that the medium may contain small quantities of compounds with a flash point below the ranges given above provided that the flash point of the medium is within the ranges given. The flash point may be determined by the Pensky Closed Cup method as described in ASTM (American Society For Testing And Materials) Test Method D93.

In one embodiment the medium substantially free of to free of sulphur is an aliphatic solvent or diluent that is an oil of lubricating viscosity such as an API Group II, III, IV or V base oil. Examples of commercially available aliphatic hydrocarbon solvents or diluents, to include oils of lubricating viscosity, are Pilot™ 140 and Pilot™ 299 and Pilot™ 900 available from Petrochem Carless, Petro-Canada™ 100N, Nexbase™, Yubase™, and poly(alpha-olefins), such as, PAO-5, PAO-6, PAO-7 and PAO-8.

In one embodiment the medium substantially free of to free of sulphur is an aliphatic solvent or diluent that is a low viscosity composition having a 100° C. kinematic viscosity of 1 cSt or less. Examples of a low viscosity composition include a petroleum distillate such as a kerosene, an alkane, an alkene, an alcohol, a ketone, an ester of a carboxylic acid, or a mixture thereof.

In another embodiment of the invention the medium contains an aromatic solvent or diluent to include aromatic hydrocarbons such as toluene, xylenes and alkylated benzenes. Additional examples of commercially available aromatic hydrocarbon solvents or diluents include from Shell Chemical Shellsolv AB™ and from Exxon Chemical the Aromatic™ series of solvents Aromatic™ 100, Aromatic™ 150 and Aromatic™ 200, the Solvesso™ series of solvents Solvesso™ 100, Solvesso™ 150 and Solvesso™ 200, and HAN™ 857. If present the aromatic solvent or diluent, may be present at less 50 wt % of the medium, in another embodiment at less than 25 wt % of the medium and in another embodiment at less than 5 wt % of the medium.

In embodiments of the invention the medium substantially free of to free of sulphur is a low viscosity composition having an aliphatic hydrocarbon content on a weight basis of at least 50 or 60 or 70 or 80 or 90% to 100%. For example the low viscosity composition could be a petroleum distillate having an aliphatic content of 90% and an aromatic content of 10%, or could be 80% aliphatic petroleum distillate and 20% alcohol.

Composition

The invention further provides a composition comprising:
  (a) a medium substantially free of to free of sulphur; and
  (b) an additive containing an acylating group and a polymer derived from of an olefin containing 2 to 8 carbon atoms, wherein the additive has a mole ratio of acylating group to polymer of 0.3:1 to 1.6:1, 0.8:1 to 1.45:1, or 1:1 to 1.4:1. In embodiments of the invention the additive of this composition can be a reaction product, as described throughout the application, of an acylated polymer and ammonia, an amine, or water.

Liquid Fuel

The fuel composition of the present invention optionally comprises a liquid fuel and is useful in fueling an internal combustion engine. The liquid fuel is normally a liquid at ambient conditions. The liquid fuel may be a hydrocarbon fuel, a nonhydrocarbon fuel, or a mixture thereof. The hydrocarbon fuel may be a petroleum distillate to include a gasoline as defined by ASTM specification D4814 or a diesel fuel as defined by ASTM specification D975. In an embodiment of the invention the liquid fuel is a gasoline, and in other embodiments the liquid fuel is a leaded gasoline, or a nonleaded gasoline. In another embodiment of this invention the liquid fuel is a diesel fuel. The hydrocarbon fuel may be a hydrocarbon prepared by a gas to liquid process to include for example hydrocarbons prepared by a process such as the Fischer-Tropsch process. The nonhydrocarbon fuel may be an oxygen containing composition, often referred to as an oxygenate, to include an alcohol, an ether, a ketone, an ester of a carboxylic acid, a nitroalkane, or a mixture thereof. The nonhydrocarbon fuel may include for example methanol, ethanol, methyl t-butyl ether, methyl ethyl ketone, transesterified oils and/or fats from plants and animals such as rapeseed methyl ester and soybean methyl ester, and nitromethane. Mixtures of hydrocarbon and nonhydrocarbon fuels may include for example gasoline and methanol and/or ethanol, diesel fuel and ethanol, and diesel fuel and a transesterified plant oil such as rapeseed methyl ester. In an embodiment of the invention the liquid fuel is an emulsion of water in a hydrocarbon fuel, a nonhydrocarbon fuel, or a mixture thereof. In several embodiments of this invention the liquid fuel may have a sulphur content on a weight basis that is 5000 ppm or less, 1000 ppm or less, 300 ppm or less, 200 ppm or less, 30 ppm or less, or 10 ppm or less.

The liquid fuel of the invention is present in a fuel composition in a major amount that is generally greater than 50% by weight, and in other embodiments is present at greater than 90% by weight, greater than 95% by weight, greater than 99.5% by weight, or greater than 99.8% by weight.

Oil of Lubricating Viscosity

The lubricating oil composition includes natural or synthetic oils of lubricating viscosity, oil derived from hydrocracking, hydrogenation, hydrofinishing, and unrefined, refined and re-refined oils and mixtures thereof.

Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch gas-to-liquid synthetic procedure as well as other gas-to-liquid oils. In one embodiment the polymer composition of the present invention is useful when employed in a gas-to-liquid oil. Often Fischer-Tropsch hydrocarbons or waxes may be hydroisomerised.

In one embodiment the base oil is a polyalphaolefin including a PAO-2, PAO-4, PAO-5, PAO-6, PAO-7 or PAO-8. The polyalphaolefin in one embodiment is prepared from dodecene and in another embodiment from decene.

Oils of lubricating viscosity may also be defined as specified in the American Petroleum Institute (API) Base Oil Interchangeability Guidelines. In one embodiment the oil of lubricating viscosity comprises an API Group I, II, III, IV, V, VI or mixtures thereof, and in another embodiment API Group II, III, IV or mixtures thereof. In another embodiment the oil of lubricating viscosity is a Group III or IV base oil and in another embodiment a Group IV base oil. If the oil of lubricating viscosity is an API Group II, III, IV, V or VI oil there may be up to 40 wt % and in another embodiment up to a maximum of 5 wt % of the lubricating oil an API Group I oil present.

The oil of lubricating viscosity in one embodiment is present from 60 wt % to 99.5 wt % of the composition or 75 wt % to 97 wt % of the composition.

Additional Performance Additive

The method optionally comprises a composition of which further includes at least one additional performance additive. The other performance additives include metal deactivators, detergent, dispersant, viscosity modifiers, friction modifiers, dispersant viscosity modifiers, extreme pressure agents, antiwear agents, antioxidant, corrosion inhibitors, foam inhibitors, demulsifiers, pour point depressants, seal swelling agents and mixtures thereof.

The total combined amount of the additional performance additive compounds present on an oil free basis ranges from 0 wt % to 25 wt % or 0.01 wt % to 20 wt % of the composition. Although one or more of the other performance additives may be present, it is common for the other performance additives to be present in different amounts relative to each other.

In one embodiment the composition is in a concentrate forming amount. If the present invention is in the form of a concentrate (which may be combined with additional oil to form, in whole or in part, a finished lubricant and/or liquid fuel), the ratio of the additive of the invention and/or other additional performance additives in an oil of lubricating viscosity and/or liquid fuel, to diluent oil is in the range of 80:20 to 10:90 by weight.

Antioxidants include a molybdenum dithiocarbamate, a sulphurised olefin, a hindered phenol, a diphenylamine; detergents include neutral or overbased, Newtonian or non-Newtonian, basic salts of alkali, alkaline earth and transition metals with one or more of a phenate, a sulphurised phenate, a sulphonate, a carboxylic acid, a phosphorus acid, a mono- and/or a di-thiophosphoric acid, a saligenin, an alkylsalicylate, a salixarate; and dispersants include N-substituted long chain alkenyl succinimide as well as posted treated version thereof, post-treated dispersants include those by reaction with urea, thiourea, dimercaptothiadiazoles, carbon disulphide, aldehydes, ketones, carboxylic acids, hydrocarbon-substituted succinic anhydrides, nitriles, epoxides, boron compounds, and phosphorus compounds.

Antiwear agents include compounds such as metal thiophosphates, especially zinc dialkyldithiophosphates; phosphoric acid esters or salt thereof; phosphites; and phosphorus-containing carboxylic esters, ethers, and amides; antiscuffing agents including organic sulphides and polysulphides, such as benzyldisulphide, bis-(chlorobenzyl) disulphide, dibutyl tetrasulphide, di-tertiary butyl polysulphide, di-tert-butylsulphide, sulphurised Diels-Alder adducts or alkyl sulphenyl N'N-dialkyl dithiocarbamates; and Extreme Pressure (EP) agents including chlorinated wax, organic sulphides and polysulphides, such as benzyldisulphide, bis-(chlorobenzyl) disulphide, dibutyl tetrasulphide, sulphurised methyl ester of oleic acid, sulphurised alkylphenol, sulphurised dipentene, sulphurised terpene, and sulphurised Diels-Alder adducts; phosphosulphurised hydrocarbons, metal thiocarbamates, such as zinc dioctyldithiocarbamate and barium heptylphenol diacid; may also be used in the composition of the invention.

Additionally the invention may also include friction modifiers including fatty amines, esters such as borated glycerol esters, partial esters of glycerol such as glycerol monooleate, fatty phosphites, fatty acid amides, fatty epoxides, borated fatty epoxides, alkoxylated fatty amines, borated alkoxylated fatty amines, metal salts of fatty acids, fatty imidazolines, condensation products of carboxylic acids and polyalkylene-polyamines, amine salts of alkyl-phosphoric acids; viscosity modifiers including hydrogenated copolymers of styrene-butadiene, ethylene-propylene polymers, polyisobutenes, hydrogenated styrene-isoprene polymers, hydrogenated isoprene polymers, polymethacrylate acid esters, polyacrylate acid esters, polyalkyl styrenes, alkenyl aryl conjugated diene copolymers, polyolefins, polyalkylmethacrylates and esters of maleic anhydride-styrene copolymers; and dispersant viscosity modifiers (often referred to as DVM) include functionalised polyolefins, for example, ethylene-propylene copolymers that have been functionalized with the reaction product of maleic anhydride and an amine, a polymethacrylate functionalised with an amine, or styrene-maleic anhydride copolymers reacted with an amine; may also be used in the composition of the invention.

Other performance additives such as corrosion inhibitors including octylamine octanoate, condensation products of dodecenyl succinic acid or anhydride and a fatty acid such as oleic acid with a polyamine; metal deactivators including derivatives of benzotriazoles, 1,2,4-triazoles, benzimidazoles, 2-alkyldithiobenzimidazoles or 2-alkyldithiobenzothiazoles; foam inhibitors including copolymers of ethyl acrylate and 2-ethylhexylacrylate and optionally vinyl acetate; demulsifiers including polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides; and seal swell agents including Exxon Necton-37™ (FN 1380) and Exxon Mineral Seal Oil (FN 3200); may also be used in the composition of the invention.

The invention further provides a method of imparting at least one of detergency, dispersancy, corrosion inhibition or corrosion reduction to a liquid fuel or lubricating composition, the method comprising lubricating or fueling with a composition comprising:

(d) a medium substantially free of to free of sulphur;
(e) an additive containing an acylating agent and a polymer derived from of an olefin containing 2 to 8 carbon atoms; and
(f) a liquid fuel or an oil of lubricating viscosity, wherein the additive has a mole ratio of acylating agent to polymer of 0.3:1 to 1.6:1, 0.8:1 to 1.45:1, or 1:1 to 1.4:1. In embodiments of the invention, the additive of this composition can be a reaction product, as described throughout the application, of an acylated polymer and ammonia, an amine, or water.

In one embodiment the additive is the hydrolysed product and it has corrosion inhibition or corrosion reduction properties.

In one embodiment the additive is the succinimide product and it has detergent, dispersant properties.

Industrial Application

In one embodiment the invention is useful for a liquid fuel or for an internal combustion engine. In another embodiment the invention is useful for an oil of lubricating viscosity for lubricating an internal combustion engine.

The internal combustion engine includes a 2-stroke or 4-stroke engine fuelled with gasoline, diesel, a natural gas or a mixed gasoline/alcohol. The diesel engine includes both light duty and heavy duty diesel engines. The gasoline engine includes a direct injection gasoline engine.

In one embodiment the invention is useful for imparting to a fuel composition at least one of improved fuel economy, a homogeneous air/fuel mix, nozzle cleanliness, injector cleanliness, improved handling and a final product with a higher actives content in the medium substantially free of to free of sulphur i.e. more concentrated. The composition of the present invention, as described throughout the application, comprising a medium, which can be substantially free of to free of sulphur, and an additive, derived from the reaction product of an olefin polymer and an acylating agent, will generally have a lower viscosity at the same actives level or an increased concentration of actives at the same viscosity compared to a composition containing an additive derived from a reaction product in which the ratio of acylating agent to polymer is greater, that is, in which more equivalents of acylating agent are reacted per equivalent of polymer. The composition of this invention provides a method to reduce the viscosity of an additive concentrate for improved handling/transferring or to increase the level of actives in an additive concentrate while maintaining the ability to handle/transfer the concentrate.

The following examples provide an illustration of the invention. These examples are non exhaustive and are not intended to limit the scope of the invention.

EXAMPLES

Preparative Example 1

Ratio Maleic Anhydride to Polyisobutylene of 1.3:1

18.18 Kg of Glissopal 1000 (number average molecular weight ~1000 and a vinylidene content of >70%, 1 equiv.) is charged into a sealed vessel at 100° C. and stirred. The vessel is heated to 167° C. and vacuum applied. The vessel is then pressurised with a nitrogen atmosphere (1 barg) whilst heating to 175° C. Once stabilized at 175° C., maleic anhydride is added via a jacketed syringe pump (ISCO pump) with traced lines. The vessel is then heated to a 220° C. over 4 hours from the initial charge of maleic anhydride addition. A further 65 ml of maleic anhydride is added in one dose, followed by a continuous feed of maleic anhydride at a rate of 22 mL/min for 50 minutes. After a further 3 hours 10 mins a further 818 ml of maleic anhydride is charged over 37 minutes, whilst heating the vessel to 225° C. by the end of the addition. The reaction is then held at 225° C. for a further 10 hours. The total amount of MAA added throughout the reaction is 2.32 kg, 1.3 equivs. The final product has a Kinematic Viscosity at 100° C. of 570 cSt (mm/s), and a TAN of 127 mgKOH/g.

Preparative Example 2

Ratio Maleic Anhydride to Polyisobutylene of 1.2:1

The process is the same as Preparative Example 1, except the amount of maleic anhydride is reduced to provide a product with a maleic anhydride to polyisobutylene ratio of 1.2:1.

Preparative Examples 3 to 4

Ratio Maleic Anhydride to Polyisobutylene of 1.3:1

Same as Preparative Example 1, except polyisobutylene TPC®555 and TPC®575 are used instead of Glisopal®1000 respectively. TPC®555 has a number average molecular weight of 550 and TPC®575 has a number average molecular weight of 750.

Comparative Preparative Example 1

37,000 Kg of Glissopal®1000 is charged into a sealed vessel at 100° C. along with 1 liter of antifoam agent. The vessel is heated to 167° C. under vacuum and then pressurised to 100 kPa with nitrogen before heating to 175° C. 1883 Kg of maleic anhydride was added over a period of 70 minutes whilst heating the vessel to 220° C. over 4 hours. The vessel is then charged with 6240 Kg of maleic anhydride and reacted for 4 hours. Unreacted maleic anhydride is removed by vacuum stripping. The final product has a Total Acid Number of 152 and a maleic anhydride to Glissopal® 1000 ratio of 2.24:1.

Example 1 (EX 1)

1366 g of the product of Preparative Example 1, is stirred into 134 g of Pilot®900 in a vessel to form a mixture. The mixture is then filtered through a Celite pad under vacuum. The mixture is then heated to 110° C. and stirred at 300 rpm under nitrogen. 36.1 g of tetraethylene pentamine (TEPA) is added dropwise over 30 minutes before heating the vessel to 175° C. and held for 4 hours. The vessel was then cooled to provide a product with a Kinematic Viscosity at 100° C. of 482 mm/s (cSt); a TBN of 72 and a nitrogen content of 3.66 wt %. The final product has 73 wt % polyisobutylene succinimide and 27 wt % Pilot®900 and nitrogen to carbonyl ratio of 1.8:1.

Example 2 (EX 2)

The product of Preparative Example 2 vessel is further charged with 122.4 g of Pilot®900 commercially available from Petrochem Carless. The vessel is equipped with a paddle stirrer, a dog leg adaptor and mechanical stirrer before and then sealed with an inlet for an inert gas (nitrogen). The contents of the vessel are warmed to 110° C. and stirred at 500 rpm. To the vessel, 114.9 g of tetraethylene pentamine (TEPA) is then added drop wise over 78 minutes. 10 g of Pilot® 900 is charged to the dropping funnel and added to the reaction helping to wash in any residual TEPA. The vessel is lagged with glass wool and the temperature increased to 175° C. Once at 175° C. the reaction is held for 4 hours. Analysis of the product indicates a nitrogen to carbonyl ratio of 1.79:1. The final product has 15 wt % Pilot®900 and 85 wt % of a polyisobutylene succinimide.

Example 3 (EX 3)

340 g of the polyisobutylene succinic anhydride from Preparative Example 1, and 60 g of Pilot®900 are charged into a vessel and blended for 1 hour. The contents of the vessel are stirred at 400 rpm and heated to 90° C. The vessel is then charged with nitrogen to provide an inert atmosphere before charging with 5.9 g of water over 10 minutes and stirring for 2 hours. The product formed has a Total Acid Number of 163 mg/KOH and a Kinematic Viscosity at 100° C. of 500 mm/s (cSt). The product formed contains 85 wt % hydrolysed product and 15 wt % Pilot®900. The carbonyl to water ratio is 0.5:1

Reference Example 1 (REF 1)

Reference Example 1 is prepared in a similar process to Example 1, except Pilot®900 is replaced with SN330 Base Oil. The succinimide final product is present at 60 wt % with the SN330 present at 40 wt %.

Reference Example 2 (REF 2)

Reference Example 2 is prepared using 35560 Kg of the product of Comparative Preparative Example 1, adding SN330 base oil to and further placing in a vessel purged with nitrogen. The vessel is heated to 110° C. and 3777 Kg of tetraethylene pentamine (TEPA) is added over 3 hours with the temperature varying from 110° C. to 120° C. throughout the addition. The vessel is then heated to 150° C. for 4 hours and further purged with nitrogen for 1 hour. The vessel is then heated to 175° C. and held for 4 hours. After cooling the final product has a nitrogen to carbonyl ratio of 2.24:1, a Kinematic Viscosity at 100° C. of 495 mm/s (cSt) and a TBN of 79. The amount of SN330 base oil present is enough to provide a final product with 60 wt % succinimide and 40 wt % SN330.

Reference Example 3 (REF 3)

Reference Example 3 is the same as Reference Example 2, except SN330 is replaced with Pilot®900.

Test 1: XUD9 Fouling Test

The XUD9 fouling test is carried out according to the CEC test method CEC F-23-A-01 and International Standard method ISO 4010. Generally better results are obtained for samples with a lower flow blockage values and higher remaining flow values. The amount of additive employed in the test for each example is also shown in Table 1. The results obtained were:

TABLE 1

| Example | Dosage of Additive in Fuel | Average of 2 Experiments for Flow Blockage (%) | Average of 2 Experiments for Flow Remaining (%) |
| --- | --- | --- | --- |
| REF 1 | 80 | 55.4 | 44.5 |
| REF 2 | 80 | 61 | 39 |
| REF 3 | 80 | 57 | 43 |
| EX 1 | 70 | 47.5 | 52.5 |

The results indicate the combination of a succinimide additive as described in the invention in combination with a medium substantially free of to free of sulphur causes reduced fouling compared to the reference examples. Furthermore the reduced fouling occurs with a dosage of 10 ppm less than the reference examples.

By comparing the succinimide wt % and the Kinematic Viscosity at 100° C. of each final product, the results indicate that the invention is able to produce a more concentrated product relative the reference examples. Furthermore, the Kinematic Viscosity of each of the final products of the invention is similar or less than the reference examples. Consequently, the final products of the invention have a higher succinimide content which results in improved handleability.

Test 2: Corrosion in Presence of Water

The corrosion test is carried out by following the ASTM Method D665-03, Procedure A (Distilled Water) and Procedure B (Synthetic Sea Water) using 60 ppm treat rate of Example 3. The results obtained for Procedure A and Procedure B for Example 3 indicate no corrosion has taken place.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein any member of a genus (or list) may be excluded from the claims.

While the invention has been explained, it is to be understood that various modifications thereof will become apparent to those skilled in the art upon reading the specification. Therefore, it is to be understood that the invention disclosed herein is intended to cover such modifications as fall within the scope of the appended claims.

We claim:
1. A process for preparing an additive comprising the steps of:
   (1) reacting a polymer derived from an olefin containing 2 to 8 carbon atoms with an acylating agent to form an acylated polymer, wherein the acylating agent is an alpha, beta-unsaturated mono- or polycarboxylic acid, anhydride, ester or derivative thereof; and
   (2) reacting the acylated polymer of step (1) with ammonia or an amine in a medium that is an aliphatic hydrocarbon oil of lubricating viscosity having a sulphur content of less than 25 ppm and a flash point of 105° C. or higher to form a succinimide product;
wherein the mole ratio of the acylating agent to polymer in step (1) is from 1:1 to 1.4:1 and the reaction is carried out in the absence of the halogen chlorine;
wherein the acylated polymer in step (1) contains less than 20 mole % of unreacted polymer;
wherein the acylated polymer of step (1) contains 60 wt % or more as a mono-substituted acylated polymer; and
wherein the ratio of amine nitrogen groups to acylated polymer carbonyl groups of the succinimide product is 1.3:1 to 2.7:1.

2. The process of claim 1, wherein the polymer has a number average molecular weight of 450 to 2500.

3. The process of claim 1, wherein the olefin contains 3 to 6 carbon atoms.

4. The process of claim 1, wherein the polymer contains a vinylidene group present on 60% or more of the polymer molecules.

5. The process of claim 1, wherein the amine contains one or more primary or secondary amino groups.

6. The method of claim 1 wherein the medium substantially free of to free of sulphur has a sulphur content of less than 4 ppm.

7. A composition comprising:
   (a) a medium that is an aliphatic hydrocarbon of lubricating viscosity having a sulphur content of less than 25 ppm and a flash point of 105° C. or higher; and
   (b) an additive prepared according to a process comprising the steps of:
      (1) reacting a polymer derived from an olefin containing 2 to 8 carbon atoms with an acylating agent to form an acylated polymer, wherein the acylating agent is an alpha, beta-unsaturated mono- or polycarboxylic acid, anhydride, ester or derivative thereof; and
      (2) reacting the acylated polymer of step (1) with ammonia or an amine in the medium to form a succinimide product;
      wherein the mole ratio of the acylating agent to polymer in step (1) is from 1:1 to 1.4:1 and the reaction of step (1) is carried out in the absence of the halogen chlorine;
      wherein the acylated polymer in step (1) contains less than 20 mole % of unreacted polymer;
      wherein the acylated polymer of step (1) contains 60 wt % or more as a mono-substituted acylated polymer; and
      wherein the ratio of amine nitrogen groups to acylated polymer carbonyl groups of the succinimide product is 1.3:1 to 2.7:1.

8. A method of imparting at least one of detergency, dispersancy, corrosion inhibition or corrosion reduction to a liquid fuel or lubricating composition, the method comprising adding to said liquid fuel or lubricating composition a composition comprising:
   (a) a medium that is an aliphatic hydrocarbon of lubricating viscosity having a sulphur content of less than 25 ppm and a flash point of 105° C. or higher;
   (b) an additive prepared according to a process comprising the steps of:
      (1) reacting a polymer derived from an olefin containing 2 to 8 carbon atoms with an acylating agent to form an acylated polymer, wherein the acylating agent is an alpha, beta-unsaturated mono- or polycarboxylic acid, anhydride, ester or derivative thereof; and
      (2) reacting the acylated polymer of step (1) with ammonia or an amine in ft the medium to form a succinimide product;
      wherein the mole ratio of the acylating agent to polymer in step (1) is from 1:1 to 1.4:1 and the reaction of step (1) is carried out in the absence of the halogen chlorine;
      wherein the acylated polymer in step (1) contains less than 20 mole % of unreacted polymer;
      wherein the acylated polymer of step (1) contains 60 wt % or more as a mono-substituted acylated polymer; and
      wherein the ratio of amine nitrogen groups to acylated polymer carbonyl groups of the succinimide product is 1.3:1 to 2.7:1; and
   (c) a liquid fuel or an oil of lubricating viscosity.

9. A fuel composition comprising a fuel and a fuel additive prepared by:
   (1) reacting a polymer derived from an olefin containing 2 to 8 carbon atoms with an acylating agent to form an acylated polymer, wherein the acylating agent is an alpha, beta-unsaturated mono- or polycarboxylic acid, anhydride, ester or derivative thereof; and
   (2) reacting the acylated polymer of step (1) with ammonia or an amine in a medium that is an aliphatic hydrocarbon oil of lubricating viscosity having a sulphur content of less than 25 ppm and a flash point of 105° C. or higher to form a succinimide product;
   wherein the mole ratio of the acylating agent to polymer in step (1) is from 1:1 to 1.4:1 and the reaction is carried out in the absence of the halogen chlorine;
   wherein the acylated polymer in step (1) contains less than 20 mole % of unreacted polymer;
   wherein the acylated polymer of step (1) contains 60 wt % or more as a mono-substituted acylated polymer; and wherein the ratio of amine nitrogen groups to acylated polymer carbonyl groups of the succinimde product is 1.3:1 to 2.7:1.

10. The fuel composition of claim 9 wherein the medium substantially free of to free of sulphur has a sulphur content of less than 4 ppm.

\* \* \* \* \*